United States Patent

[11] 3,593,277

| [72] | Inventor | Rudolf Faude<br>182 Eaton, Crest Drive, Eatontown, N.J. 07724 |
|---|---|---|
| [21] | Appl. No. | 721,016 |
| [22] | Filed | Apr. 12, 1968 |
| [45] | Patented | July 13, 1971 |

[54] MAXIMUM DECELERATION INDICATOR
11 Claims, 12 Drawing Figs.

[52] U.S. Cl. ...................................... 340/72,
340/81, 340/262, 200/61.45
[51] Int. Cl. ........................................ B60q 1/26
[50] Field of Search........................... 340/52, 60,
71, 72, 81, 94, 262; 200/61.45

[56] References Cited
UNITED STATES PATENTS

| 3,022,393 | 2/1962 | Weaver | 340/262 UX |
| 3,295,101 | 12/1966 | Ellis | 340/262 X |
| 3,380,046 | 4/1968 | Paonessa | 340/262 |
| 3,457,382 | 7/1969 | Boswell | 340/262 X |

*Primary Examiner*—Alvin H. Waring
*Attorney*—Ostrolenk, Faber, Gerb and Soffen

ABSTRACT: A device for providing an illuminated indication of rapid deceleration of a vehicle. A biased momentum sensor moves against the biasing force when an appropriate magnitude of deceleration is experienced to establish a closed circuit and thereby illuminate a lamp. The biasing force imposed upon the momentum sensor is adjustable over a broad range while at the same time maintaining the gap distance between the cooperating contacts of the device constant. The contacts are so arranged as to provide for locking of the device in the illuminated condition in situations involving extremely abrupt deceleration. Sensing means may also be provided for providing an illuminated indication of an attempt to bring the vehicle carrying the sensor to an abrupt halt.

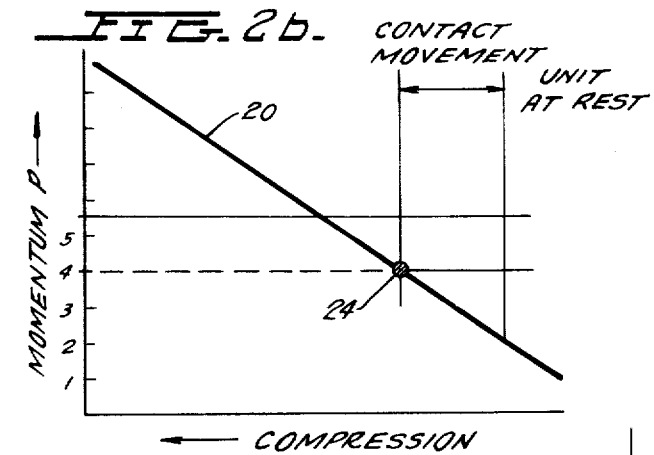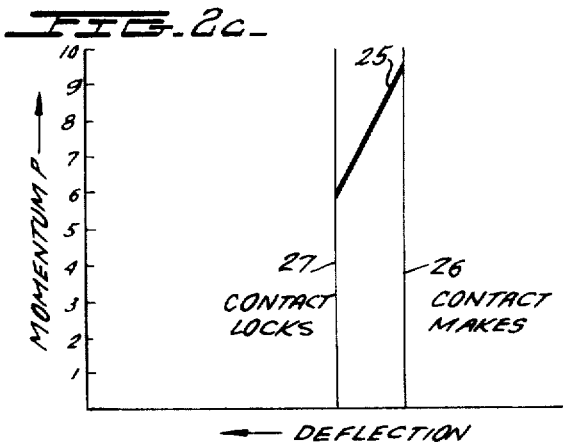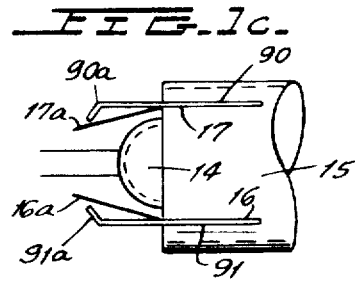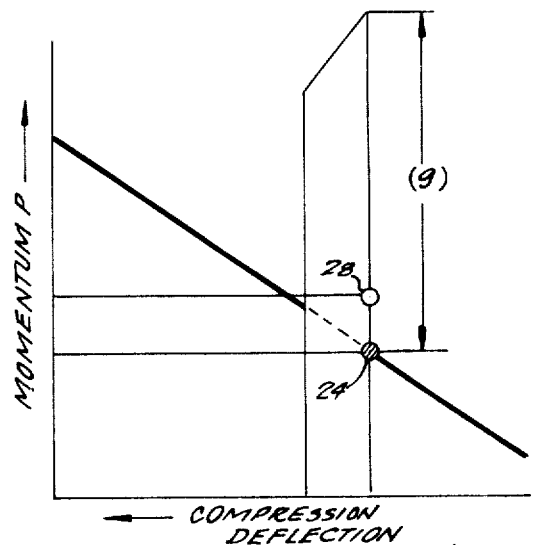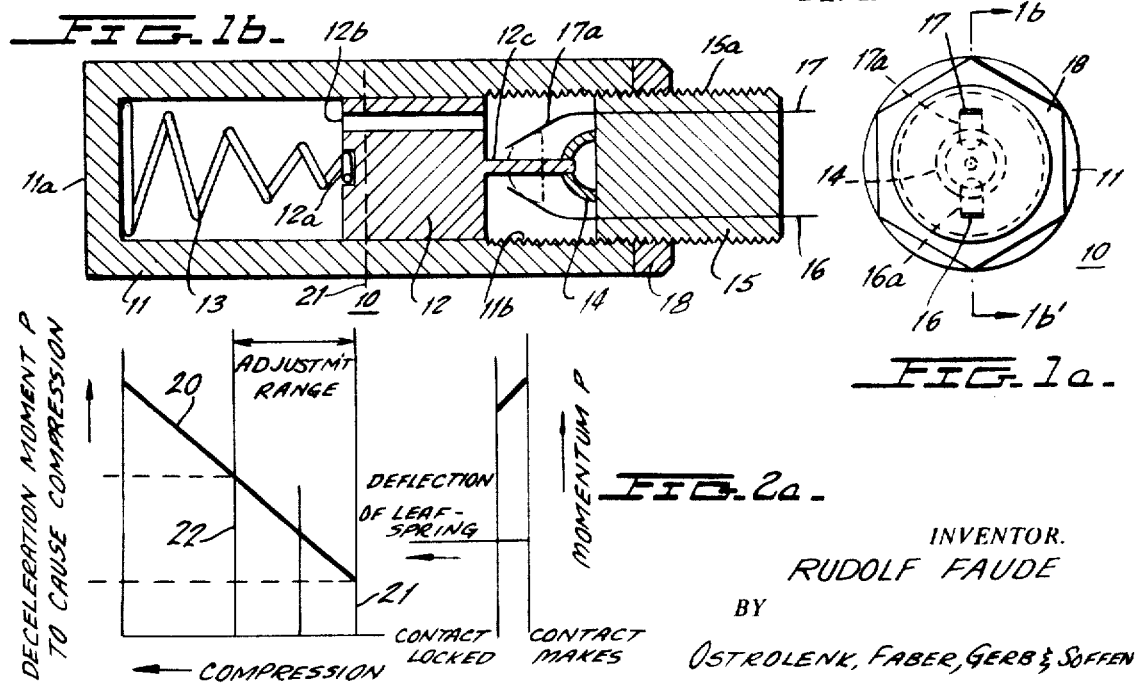

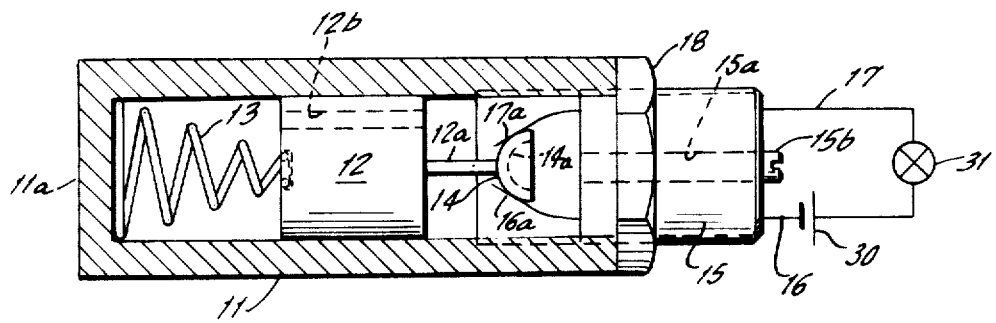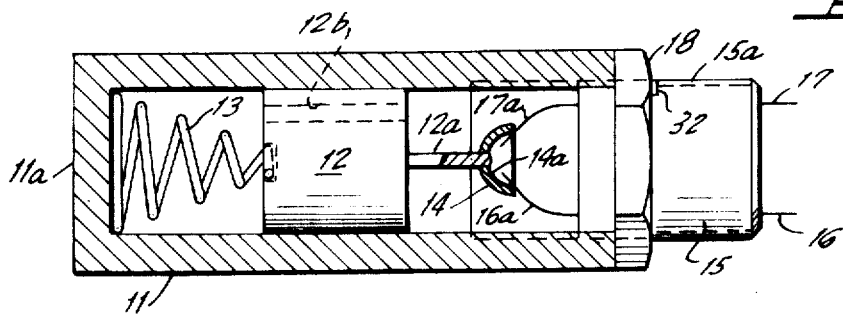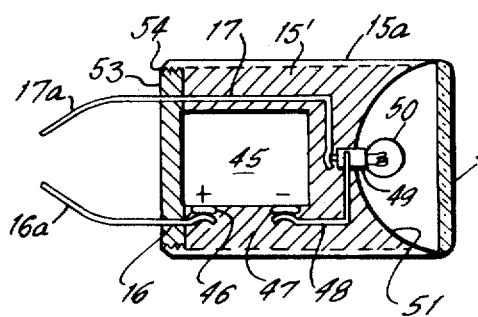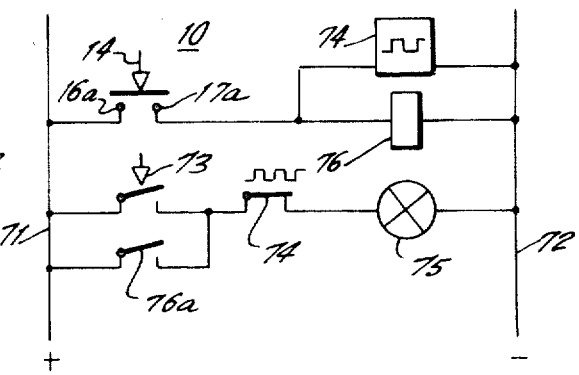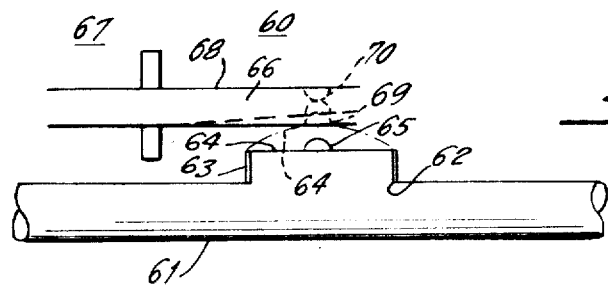

MAXIMUM DECELERATION INDICATOR

The present invention relates to safety devices for vehicles and the like and more particularly to a novel maximum deceleration indicator to provide a positive indication for approaching vehicles that the vehicle in question is attempting maximum deceleration.

The distance required to bring a vehicle, moving at a predetermined speed, to a full stop may be represented by the equation $D=(ST/2)$ or $D=AT^2/2$ where $D$ = distance, $S$ = speed; $T$ = time; $A$ = deceleration. The required time consists of actual braking time (when the brakes are applied) plus reaction time. Actual braking time can be considered as a constant for cars with average brakes and tires on the same road surface. The variable is the reaction time.

Most rear end collisions result form the fact that the driver in the following car is unable to accurately determine the speed of the car which precedes him. The fact that a quite sudden stop is being attempted by the preceding car is not made clear to the following car until, in most cases, the driver of the following car is not able to undertake precautionary measures to avoid a collision.

The maximum deceleration indicator of the present invention is of significant aid in reducing the reaction time of a following driver and will thereby contribute significantly to a decrease in accident rate. The device of the present invention is a preferred safety device in that it operates to prevent accidents rather than in attempting to minimize the harmful consequences of an accident.

The invention is comprised of a biased momentum sensing device which is designed to provide a contact closure at maximum deceleration by overcoming the biasing force as a result of the magnitude of deceleration experienced by the momentum sensor. The contact closure time duration is substantially equivalent to the maximum deceleration time. Once the deceleration rate reduces the contact assembly reopens to return to the normal unlit lamp condition.

The contact closure is provided to turn on a rear mounted emergency light preferably either of a color other than the regular brake-light illumination or which may be comprised of a pulse generator which initiates a flashing condition preferably at a frequency which is not capable of being produced by a human operator in order to simulate a light flashing condition.

In a situation where a vehicle exceeds the selected maximum deceleration rate such as in the case of an accident where a vehicle hits an immovable object, the rather abrupt decrease in velocity (or complete stop) is taken into account by providing locking means which automatically provides a continuous illumination of the emergency signal, which illumination will not return to normal until manually reset. Thus if a vehicle hits an object the emergency lights remain illuminated providing a very effective and helpful lamp indication (especially during darkness) where the driver either forgets to turn on the emergency light or may be unable to do so as a result of either suffering from shock or being rendered unconscious as a result of the rather abrupt deceleration.

In another alternative embodiment a maximum deceleration attempts indicator may be provided to warn approaching vehicles of the fact that the driver of a vehicle in distress is attempting maximum deceleration but may be unable to effect maximum deceleration due to road or weather conditions, for example. As one possibility an attempt at maximum deceleration may be made on a wet or icy road. The tires may be locked as a result of the sudden application of the brakes but due to the slippery road surface the vehicle is unable to decelerate at a maximum rate. No positive indication of this condition is capable of being generated by conventional devices.

By way of an alternative embodiment of the present invention, a flexible diaphragm may be provided in the hydraulic system of the brakes which is capable of deflecting to close a normally open contact pair in order to illuminate either a rear mounted flashing lamp or a rear mounted independent emergency lamp which is continuously illuminated so long as a maximum deceleration attempt is being made.

It is therefore one object of the present invention to provide a novel maximum deceleration indicator capable of illuminating or alternatively causing the flashing of a lamp to provide a distinct indication that a maximum deceleration attempt is being made to approaching vehicles.

Another object of the present invention is to provide novel means for monitoring attempts at maximum deceleration including a deceleration sensing means for providing a lamp indication of a maximum deceleration attempt and further including locking means for automatically locking the indicating lamp into either continuous illumination or continuous flashing when a predetermined maximum deceleration limit is achieved.

These as well as other objects of the present invention will become apparent when reading the accompanying description and drawings in which:

FIG. 1a shows an end view of one preferred embodiment of the present invention.

FIG. 1b shows a sectional view of the embodiment of FIG. 1a looking in the direction 1b—1b'.

FIG. 1c is a view showing the contact structure of an alternative contact arrangement for use with the device of FIGS. 1a and 1b.

FIG. 2a is a plot showing the relationship between momentum and compression of the biasing member of the embodiment of FIG. 1b.

FIGS. 2b—2d are further plots provided to facilitate an understanding of the operation of the invention shown in FIG. 1b.

FIGS. 3a and 3b show the embodiment of FIG. 1b at maximum deceleration and in the locked position, respectively.

FIG. 4 shows a sectional view of one lamp assembly which may be employed with the embodiment of FIG. 1b.

FIG. 5 shows an attempted maximum deceleration sensing device.

FIG. 5a is a schematic diagram of a locking circuit embodiment which may be employed with the device of FIG. 1a.

Referring now to the drawings, FIGS. 1a and 1b show a maximum deceleration indicator 10 comprised of a hollow substantially cylindrical housing 11 having a first sealed end 11a. A biasing spring 13 is mounted in the interior of housing 11 so that its first end touches the interior surface of end 11a and so that its opposite end is fixed within a substantially circular groove 12a provided in momentum sensor 12. Momentum sensor 12 is a solid substantially cylindrical shaped member free to experience linear movement relative to housing 11 and being biased to a normal rest position by spring 13. A suitable opening 12b in cylinder 12 communicates with the opposite faces thereof to permit rapid adjustment of the air pressure within housing 11, in a manner to be more fully described. The right-hand end of cylinder 12 is provided with an axially aligned projection 12c having a lens or hemispherical shaped contact 14 secured to the distal end thereof.

The interior of housing 11 is provided with a tapped portion 11b which is designed to threadedly engage a leaf spring contact holder member 15 which is threaded along its exterior surface portion 15a to provide for adjustment of the contact structure in a manner to be more fully described. A fastener nut 18 threadedly engages member 15 to rigidly secure and lock member 15 in any axial position relative to housing 11.

A pair of leaf springs 16 and 17 are embedded within holder member 15 and are bent at their left-hand ends (relative to FIG. 1b) for the purpose of engaging movable contact member 14 in a manner to be more fully described.

FIG. 2a, which is aligned relative to the sectional view shown in FIG. 1b, is a graph containing curve 20 which shows the relationship between compression and deceleration momentum (P) causing compression. Vertical solid line 21

(which is shown as a dotted line in FIG. 1b) indicates minimum compression (i.e., the position at which the momentum sensor 12 is at rest). As the momentum sensor 12 moves toward the left relative to FIG. 1b spring 13 is compressed from the minimum amount (vertical line 21) to the maximum amount indicated by vertical line 22. In moving toward the left the momentum sensor 12 carries with it the movable contact 14 which, at one point in time engages the inwardly bent portions 16a and 17a of leaf springs 16 and 17 to provide a closed electrical path for illuminating a lamp in a manner to be more fully described.

FIG. 2b is a plot showing the relationship of compression to momentum (P) represented by line 20 which is substantially identical to that shown in FIG. 2a. As momentum sensor 12 moves toward the left (relative to FIG. 1b) compression at point 24 must be suddenly and abruptly increased to further compress spring 13 as a result of the leaf spring structure 16—17. This abrupt increase in required force allows a rather wide tolerance (g) as plotted in FIG. 2d for adjustment of the momentum sensor. The reason for this sudden increase in required compression force is due to the fact that the inwardly bent portions 16a and 17a of the leaf springs bear against the movable contact member 14 once it engages these inwardly bent portions to impose a force working against the movement of the momentum sensor 12 in the left-hand direction. The line 25, shown in the plot of FIG. 2c, indicates the amount of deflection plotted against momentum of the leaf spring members and indicates the decreasing momentum required to move the sensor 12 after it engages the contacts 16a and 17a and they start to flex. Vertical line 26 indicates the moment at which movable contact 14 engages leaf spring portions 16a and 17a. Deflection increases until the leaf spring contacts reach the position indicated by vertical line 27, at which point the semicircular contact moves beyond the distal ends of inwardly bent portions 16a and 17a, at which point the contacts become locked into engagement.

The plot of FIG. 2d shows the combination of the curves 20 and 25 of FIGS. 2b and 2c in a single plot. Point 28 represents the maximum momentum which would compress spring 13 to more than the momentum produced at point 24. Without this feature the unit would be locked in at the momentum represented by point 25. However, the lock-in feature is not achieved until the additional force (g) is provided to produce the lock-in feature.

In the case of an accident the deceleration momentum is always a multiple of the possible maximum brake momentum. Even at a very slow speed, the embodiment of FIG. 1b will still lock-in as a result of a sudden decrease of speed which may be caused by an accident. This allows for adjustment of the unit in order to make contact at maximum deceleration momentum at high speeds such as at 60 miles per hour, or greater, at which speeds the deceleration momentum has been found to be only slightly smaller than the deceleration momentum experienced at lower speeds.

FIG. 3a shows the embodiment of FIG. 1b when maximum deceleration (i.e., maximum braking momentum) is achieved. As can clearly be seen the momentum sensor 12 overcomes the biasing force of spring 13 to an amount sufficient to move contact 14 into engagement with leaf spring portions 16a and 17a. The actual point at which engagement between movable and stationary contacts occur is made adjustable by means of rotating threaded holder member 15 which member may be locked into the selected position by tightening fastener nut 18.

FIG. 3b shows the embodiment of FIG. 1b with the sensor member in the locked in position which indicates that the maximum deceleration limit has been surpassed causing the movable contact 14 to move beyond the distal ends of leaf spring portions 16a and 17a as shown in FIG. 3b. In order to provide for an illuminated condition the terminal ends or right-hand ends of leaf springs 16 and 17 may be connected to a power supply 30 and a bulb 31 (which may, for example, be an amber bulb) as shown in FIG. 3a. The preference of providing a separate battery such as for example a dry cell battery resides in the fact that a severe collision may cause permanent damage to the car (wet call) battery to terminate illumination of the lamp at the very time when its need for illumination is greatest. By including a separate dry cell battery 30 which is known to have the capability of withstanding greater impact, the lamp 11 may remain illuminated after impact and thereby provide a positive indication of the distress condition of the vehicle.

The lamp will remain illuminated until reset which may be carried out in the following manner:

The fastening nut 18 is first loosened and the holder member 15 is then removed from housing 11. The entire assembly comprised of spring 13, momentum sensor 12 and movable contact 14 may likewise be removed from the structure in order that the movable contact may then be again positioned between leaf spring portions 16a and 17a to return to the normal operating position shown in FIG. 1b. A suitable mark or indication 32 (see FIG. 3b) may be printed or otherwise formed upon the threaded surface of member 15 so as to allow the operator to correctly position member 15 within housing 11 to the desired depth in order to return to the proper setting. A preferred manner of setting the device is by inserting a gauge into an opening 15a, which may be threaded, in order to measure the pressure (in pounds, for example) by pressing an elongated projection (not shown) of the gauge into opening 15a, causing it to bear against the interior surface 14a of contact 14. For example, the device may be set so that it requires 0.5 lbs. of pressure before contact 14 makes engagement with leaf contacts 17a and 16a. If insufficient pressure is provided, member 15 may be threaded more deeply into the opening within housing 11a. In order to assure the fact that the elements contained within the housing are maintained dirt-free, the threaded opening 15a may be sealed with a threaded sealing plug 15b.

In order that the movement of momentum sensor 13 be prevented from compressing any air contained within the interior of housing 11, a suitable opening 12b is provided within the cylinder to communicate with openings provided in opposite faces of the sensor. Thus, if the momentum sensor is moving toward the left (relative to any of the FIGS. 1b, 3a or 3b) any air which may undergo compression due to the diminishing volume of space defined by the left-hand face of sensor 12 and the interior surfaces of housing 11 is caused to pass through opening 12b in order to automatically balance the pressure on both sides of sensor 12.

FIG. 4 shows an alternative embodiment for the holder member 15 of FIGS. 1b, 3a and 3b, wherein the holder member 15' and like related elements are designated by like numerals. The compact assembly 15' has secured therein a dry cell battery 45 having a positive terminal 46 engaging the right-hand end of leaf spring 16 and a negative terminal 46 engaging another spring member 48 which is electrically connected to bulb socket 49 which threadedly receives a bulb 50. If desired, a bayonet-type socket may be employed. A reflector 51 substantially surrounds bulb 50 to concentrate the illumination intensity toward the right to pass the light rays through a glass or plastic reflector 52 which may, for example, be of an amber color to distinguish the lamp when illuminated from the normal brake light. The right-hand end of leaf spring 17 engages the base pin of bulb 50, as shown. The assembly of FIG. 4 may be provided with a threaded cover member 53 which threadedly engages a tapped opening 54 within member 15' for the purpose of removing bulb 50 and/or dry cell 45. Also, if desired, the amber reflector 52 may be made removable in order to gain access to bulb 50 for replacement purposes.

FIG. 5 shows a sensing means 60 for use in providing a lamp indication of an attempt at maximum deceleration. As shown therein, one conduit 61 of the hydraulic braking system is provided with an opening 62 for receiving a member 63 (preferably threaded) to seal the opening on conduit 61 by means of a flexible diaphragm 64 having a contact surface 65. The abrupt application of the brakes (by sudden depression of the brake pedal) causes the brake fluid within conduit 61 to deform diaphragm 64, moving it to the dotted line position 64'. This causes contact 65 to engage one leaf contact 66 of a contact assembly 67. The contact assembly is further comprised of a second leaf spring 68. Both leaf springs are further provided with suitable means (not shown) at their left-hand ends for connection into an electrical circuit. The right-hand ends are provided with semicircular contacts 69 and 70 which are caused to engage one another upon deformation of diaphragm 64 to establish an electrical circuit which, though not shown, may be of the type employed in FIGS. 3a or 4, for the purpose of providing either a constant or flashing lamp indication of an attempt at maximum deceleration.

The circuit of FIG. 5a may be used with the device of FIG. 1a. As shown, a voltage source is coupled across common conductors 71 and 72. One branch electrical path connected between the common conductors is comprised of the conventional brake light switch 73 which is in the normally open position when the brake pedal is not depressed. The left-hand end of this switch structure is connected to conductor 71 while its stationary contact is coupled to a normally closed contact pair 74 which, in turn, is connected in series with brake light bulb 75 whose opposite terminal is connected to common conductor 72. A normally open relay contact 76a is connected between common terminals of switch 73 and contact assembly 74a and conductor 71. A second branch path is comprised of maximum deceleration switch 10 (which is actually comprised of contacts 16a–14–17a and is shown only in schematic fashion in FIG. 5a) connected in series with relay 76 whose opposite terminals are connected to conductor 72. A pulse generator 74 is connected in parallel across relay 76a.

The operation of the embodiment of FIGS. 5 and 5a is as follows:

In normal operation, contact assembly 74a is normally closed when its pulse generator relay 74 is deenergized. This means that if the brake pedal (not shown) is depressed, its brake switch 73 is closed, establishing a closed circuit path for illuminating brake light 75. Once the brake pedal is released, switch 73 opens, causing brake light 75 to go out.

If a maximum deceleration of the vehicle occurs, the movement of sensor 12 causes the contacts 16a–14–17a to close, thereby simultaneously energizing relay 76 and pulse generator relay 74. Relay 76 closes its contact 76a to maintain a closed circuit path. The pulse generator relay 74 repetitively energizes and deenergizes, causing repetitive opening and closing of its associated contact pair 74a to cause lamp 75 to flash. Flashing occurs at a substantially high rate so as not to provide an erroneous indication to approaching vehicles that the driver is merely "pumping" his brakes. Even if the brake system locks and the brake pedal is released, opening of the brake switch 73 does not destroy the flashing indication. The system does not return to normal until the device 10 is released and returns contacts 16a–14–17a to the normally disengaged position. In this condition, relay 76 becomes deenergized, opening its contact 76a. Likewise, pulse relay generator 74 becomes deenergized causing its contact pair 74a to remain in the normally closed position, allowing the brake switch 73 to subsequently illuminate lamp 75, if the brakes are depressed in the normal manner.

The leaf spring arrangement of FIG. 1b, for example, may be modified in the manner shown in FIG. 1c in order to prolong the useful operating life of the device. The contact arrangement, shown in FIG. 1c, is comprised of leaf spring contacts 16 and 17, having inwardly bent portions 16a and 17a, in the same manner as is shown in FIG. 1b. However, in addition thereto, a pair of stiffer springs 90 and 91, bent inwardly at their free ends 90a and 91a, respectively, serve to provide additional stiffness to the lighter springs 16a and 17a in order to guarantee reliable performance even after continuous repeated operation and to prevent any contact bounce or chatter.

It can therefore be seen that the present invention provides a novel maximum deceleration indicator which is simple in design, easy to install and which provides a positive indication to approaching vehicles of an attempt at maximum deceleration in order to allow approaching vehicles to take appropriate measures to avoid a collision.

Although there has been described a preferred embodiment of this novel invention, many variations and modifications will now be apparent to those skilled in the art. Therefore, this invention is to be limited, not by the specific disclosure herein, but only by the appending claims.

I claim:

1. Deceleration sensing means mounted upon a vehicle comprising:
    a hollow housing;
    a sensor mounted for reciprocal movement within said housing and being normally biased toward a first rest position;
    a first contact member movable with said sensor;
    a second contact member positioned within said housing and normally spaced from said first contact member when said sensor is in the rest position;
    means engaging said sensor for adjustably positioning the sensor within said housing to control the magnitude of the biasing force;
    said second contact being movable with said adjustable positioning means whereby the spacing distance between said first and second contacts remains constant regardless of the position of the adjustable means.

2. The device of claim 1 wherein said second contact has at least a portion thereof lying in the path of movement of said first contact and is normally positioned to one side of said first contact;
    said second contact being resilient so as to be enabled to be deflected away from the path of movement of said first contact and to engage the opposite surface of said first contact when said sensor experiences deceleration of a predetermined magnitude.

3. The device of claim 1 further comprising a series circuit comprising a power source and a lamp coupled to at least one of said first and second contacts for illuminating said lamp upon engagement of said first and second contacts.

4. The device of claim 1 wherein said adjustable means further comprises means for mounting said second contact being threadedly engaged by said housing.

5. The device of claim 1 wherein said second contact is comprised of a pair of spring contacts; said adjustable means holding said spring contacts in a displaced manner;
    said adjustable means threadedly engaging said housing;
    said first contact having a substantially curved surface confronting said spring contacts for sliding engagement therewith.

6. The device of claim 1 wherein said second contact is comprised of a pair of spring contacts; said adjustable means holding said spring contacts in a displaced manner;
    said adjustable means threadedly engaging said housing;
    said first contact having a substantially curved surface confronting said spring contacts for sliding engagement therewith; said first contact being movable beyond the distal ends of said spring contacts for locking said first contact and said spring contacts in engagement when said sensor experiences a predetermined deceleration magnitude.

7. The device of claim 3 further comprising means coupled to said series circuit for causing said lamp to flash when said contacts are engaged.

8. The device of claim 1 wherein said second contact is comprised of a pair of contacts having inwardly bent edges for making sliding engagement with said first contact.

9. The device of claim 8 further comprising a pair of resilient stiffening means each positioned adjacent an associated one of said pair of contacts for providing additional contact pressure during operation thereof so as to greatly increase the operating life of the device and to increase the momentum required to attain a lock-in of the cooperating contacts and thereby prevent accidental lock-in.

10. A motion sensing device comprising:
a hollow housing;
a motion sensor mounted for reciprocating movement in said housing;
bias means positioned between said sensor and a first end of said housing normally biasing said sensor away from the first end of said housing;
a first contact mounted on the end of said sensor remote from the first end of said housing;
an adjustable contact assembly mounted adjacent the second end of said housing and having a body portion and a second contact projecting generally outwardly from said body portion toward said housing first end;
said first contact normally engaging said body portion and being disengaged from said second contact when at rest;
said body portion being adjustably movable relative to said housing to adjust the biasing force imposed upon said sensor by said biasing means.

11. A motion sensor comprising:
a hollow housing;
a sensor mounted for reciprocal movement within said housing and having a first contact secured thereto;
means positioned within said housing for biasing said sensor in a first direction;
second contact means including adjustable means normally engaging said sensor for adjustably selecting the rest position of said sensor while maintaining a constant spacing between said second contact means and said first contact regardless of the rest position of said sensor.